(12) United States Patent
Thordsen (10) Patent No.: US 12,447,681 B2
(45) Date of Patent: Oct. 21, 2025

(54) IN-LINE FILAMENT CONDITIONER/DRIER FOR 3D PRINTER

(71) Applicant: Alan T. Thordsen, Placerville, CA (US)

(72) Inventor: Alan T. Thordsen, Placerville, CA (US)

( * ) Notice: Subject to any disclaimer, the term of this patent is extended or adjusted under 35 U.S.C. 154(b) by 184 days.

(21) Appl. No.: 17/941,486

(22) Filed: Sep. 9, 2022

(65) Prior Publication Data
US 2024/0083115 A1  Mar. 14, 2024

(51) Int. Cl.
*B29C 64/314* (2017.01)
*B29C 64/118* (2017.01)
*B29C 64/295* (2017.01)
*B29C 64/321* (2017.01)
*B33Y 10/00* (2015.01)
*B33Y 30/00* (2015.01)
*B33Y 40/10* (2020.01)

(52) U.S. Cl.
CPC .......... *B29C 64/314* (2017.08); *B29C 64/118* (2017.08); *B29C 64/295* (2017.08); *B29C 64/321* (2017.08); *B33Y 10/00* (2014.12); *B33Y 30/00* (2014.12); *B33Y 40/10* (2020.01)

(58) Field of Classification Search
CPC ... B29C 64/314; B29C 64/118; B29C 64/295; B29C 64/321; B29C 64/209; B33Y 10/00; B33Y 30/00; B33Y 40/10
See application file for complete search history.

(56) References Cited

U.S. PATENT DOCUMENTS

| | | | | |
|---|---|---|---|---|
| 2001/0030383 | A1* | 10/2001 | Swanson | B29C 64/106 242/570 |
| 2008/0169449 | A1* | 7/2008 | Mundschau | C01B 3/382 252/373 |
| 2019/0255612 | A1* | 8/2019 | Mark | B29C 64/295 |
| 2020/0147882 | A1* | 5/2020 | Nadeau | B29C 64/321 |
| 2022/0411779 | A1* | 12/2022 | Ahn | B29C 64/209 |

OTHER PUBLICATIONS

Thordsen Customs Llc, "IFD-175R Inline Filament Dryer Quick Start Guide" https://thordsen3d.com, (2019) pp. 1-2.
Thordsen Customs LLC, "IFD-175S Inline Filament Dryer Quick Start Guide" https://thordsen3d.com, (2019) pp. 1-2.
Thordsen, Allan "Introducing the IFD-175 Inline Filament Dryer for 3D Printers" Youtube, https://www.youtube.com/watch?v=RfSA-LUga21, (2019).

* cited by examiner

*Primary Examiner* — Michael M. Robinson
(74) *Attorney, Agent, or Firm* — David Thomas Millers (57) ABSTRACT

A filament conditioning system or method for FDM 3D printing uses a filament tube with vent holes extending through a sidewall of the filament tube to a filament pass-through in the filament tube. A desiccant barrier contains the filament tube and includes vent holes through a sidewall of the desiccant barrier, and a cover contains the desiccant barrier and a desiccant in a space between the cover and the desiccant barrier. A heating element and temperature sensor may adjacent the filament tube within the desiccant barrier to heat a filament in the filament passthrough. The filament tube, the desiccant barrier, and the cover may be coaxial tubes held together with end caps, the end caps also providing vent holes and openings for electrical leads.

10 Claims, 6 Drawing Sheets

IN-LINE FILAMENT CONDITIONER/DRIER FOR 3D PRINTER

BACKGROUND OF THE INVENTION

Three-dimensional printing can provide economical production of three-dimensional decorative or functional objects such as miniatures, models, tools, devices, or parts for larger assemblies. A commonly used three-dimensional printing technology is referred to as Fused Deposition Modeling (FDM) 3D printing. FDM 3D printing generally uses a continuous strand of filament that is generally fed from a spool or other device to a print head which heats and deposits filament material in layers that fuse together to create a three-dimensional object. The print head or the object being printed generally moves under computer control to define the shape of the object being printed. For example, a 3D printer may move the print head in vertical steps corresponding to layers of the object and at each step may move the previously formed layers of object in two horizontal dimensions to add a layer of the object and fuse the added layer to the build plate or underlying layers.

FDM 3D printers often employ a thermoplastic material e.g., filament, and needs to heat the material to relatively high temperatures to deposit and fuse the layers of the object being printed. The heating may introduce printing errors if the material contains or carries impurities, moisture, or other volatile contaminants. For example, a print head heating a filament to 200° C. to 320° C. in a fraction of a second can cause excessive moisture on the surface or in the filament to quickly convert into steam and expand thereby forming bubbles or voids in heated filament material being deposited on the object being printed. The result being visual or structural defects in the object.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Systems and methods disclosed herein may condition a filament being fed to a print head of an FDM printer. An FDM printer, filament conditioner or drier, or filament conditioning or drying method can employ a heating system and a chemical attractor such as a desiccant. The heating system may heat filament and vaporize water or volatile substances in or on the filament, so that the chemical attractor can draw the humidity or vaporized substances away from the filament section. In operation, the heating system may preheat filament in a vented filament tube and thereby release water or other volatile substances from in or on the preheated filament, and the chemical attractor, e.g., a desiccant, can draw water or other volatiles away from the filament and through a desiccant barrier that separates the desiccant from the heating system. Heating may be conducted in a manner and at a temperature that avoids damaging or melting the filament and avoids causing rapid expansion of water or other volatile compounds to thereby avoid producing defects in the filament or in the continuity of a printing process. A print head can thus receive conditioned filament and heat the conditioned filament to a higher temperature needed for 3D printing. The conditioned filament contains little or no moisture or volatiles, so that heating in the print head does not produce defects from rapid expansion or boiling of water or other volatiles. The chemical attractor in the filament conditioner may draw water vapor away from the filament, and containment for the chemical attractor may be vented to release the water or other volatile substance periodically or continuously to avoid saturation of the chemical attractor.

In accordance with another aspect of the present disclosure, a filament conditioner/drier includes a filament guide, e.g., a filament tube, through which filament may be fed, a heating element in or adjacent to the filament guide, a desiccant barrier containing the filament guide, and a desiccant material in an enclosure and surrounding the desiccant barrier. The heating element may operate to heat the filament guide and the filament passing through the filament conditioner. The filament guide and the desiccant barrier may include ventilation holes that allow moisture or other volatile substances from the filament to flow out of the filament guide, through the desiccant barrier, and into the desiccant that chemically attracts the moisture or other volatile substance.

In one specific example of the filament conditioner/drier, the filament guide is a filament tube having ends that are threaded and having a cylindrical sidewall with vent holes. The desiccant barrier, which may also be a tube having vent holes passing through its sidewall, has a diameter that is larger than the diameter of the filament tube, so that the desiccant barrier may be coaxial with the filament tube while providing space between the desiccant barrier and the filament tube, and the heating element and other system components such as a temperature sensor, e.g., a thermocouple or thermostat, for control of the temperature of the filament, may at least partially reside in the space between the filament tube and the desiccant barrier. A cover surrounding the desiccant barrier may be a tube with a diameter larger than the diameter of the desiccant barrier, and the cover may be coaxial with the desiccant barrier. Desiccant or other chemical attractor may then be confined to a volume between the desiccant barrier and the cover. End caps may be screwed onto ends the of the filament tube, thus confining the desiccant barrier, desiccant, heating element, thermocouple, and cover. Each end cap may employ a compression fitting, e.g., a Bowden connector, that permits connection of flexible PTFE tubing e.g., Bowden tube, that allows conditioned filament to move from the filament conditioning system to a FDM 3D printer head without kinking or re-exposing the conditioned filament to the environment. Each end cap may further provide or accommodate electrical connectors for the heating element or temperature sensor and provide one or more vents to release accumulated moisture or other volatile substance from the desiccant volume.

Figure 1:
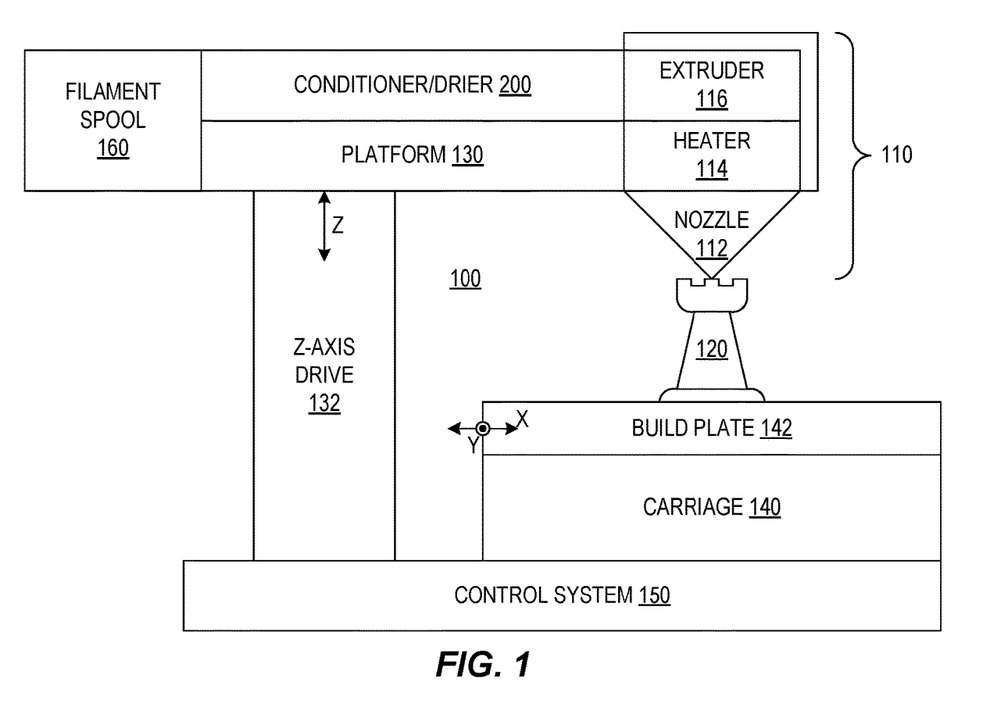
FIG. 1 is a block diagram of an FDM 3D printer in accordance with an example of the present disclosure.

FIG. 1 is a block diagram of a FDM 3D printer 100 in accordance with an example of the present disclosure. FDM printer 100 includes a print head 110 through which a filament may be fed during a 3D printing process that prints an object 120. Print head 110 may be mounted on a movable platform 130, and in the example of FIG. 1, movable platform 130 has a Z-axis drive system 132 capable of moving print head 110 up and down along a vertical (or Z) axis. Object 120 is on a build plate 142 of a carriage 140, and in the example of FIG. 1, carriage 140 is an X-Y carriage capable of moving object 120 along two horizontal (X and Y) axes. More generally, a FDM 3D printer may use other systems for moving a print head, e.g., print head 110, relative to a build table, e.g., build plate 142, on which an object, e.g., object 120, is formed. For example, movable platform or gantry 130 may alternatively be capable of moving print head 110 in X, Y, and Z directions relative to build plate 142 and object 120, or carriage 140 may be capable of moving build plate 142 in X, Y, and Z directions relative to print head 110.

A typical printing process for 3D printer 100 to print object 120 starts with a control system 150 of printer 100 operating Z-axis drive 132 to position the tip of a nozzle 112 of print head 110 close to a top surface of build plate 142. Control system 150 then controls a heater 114 and an extruder 116 of print head 110 to turn on and off a flow of filament through extruder 116, heater 114, and nozzle 112, while control system 150 also controls carriage 140 to move build plate 142 horizontally, e.g., in X and Y directions. The pattern of movement of build plate 142 and pattern of when or where nozzle 112 deposits filament material on the surface of build plate 142 forms a first layer of object 120. Control system 150 may then move print head 110 up to a height of a next layer of object 120 and control print head 110 and carriage 140 to deposit a next layer of object 120 on the preceding layer of object 110. Printer 100 can repeat the layer-printing processes to build object 120 layer-by-layer until object 120 is complete.

Print head 110 uses a flow of filament unwound from a filament spool 160, which may be mounted on or separated from movable platform 130. Current FDM 3D printers commonly use filament 160 made of a material such as Polylactic acid or polyactide (PLA), acrylonitrile butadiene styrene (ABS), acrylonitrile styrene acrylate (ASA), and nylon that is from 1.75 mm to 2.85 mm in diameter. In general, the filament on spool 160 may contain moisture or volatile substance or may have moisture or a volatile substance on surfaces of the filament. Thermoplastics are often hygroscopic (porous) and can absorb moisture vapor and other volatile substances from their environments. The moisture or volatile substance may result from faulty manufacture, damaged delivery, improper storage, or most commonly long-term exposure of filament spool 160 to the environment surrounding printer 100 during print cycles. Filament from spool 160 may accordingly have an unknown content of moisture or other volatile substances. If extruder 116 feeds filament with moisture or other volatile substance into heater 114, the moisture or volatile substance could boil or rapidly expand creating bubbles or gaps in the flow of filament through nozzle 112, which may cause printing errors, defects, or increase irregularities or surface roughness of object 120. In accordance with an aspect of printer 100 disclosed herein, extruder 116 draws or pushes filament from spool 160 through an in-line filament conditioner 200 that removes moisture or other volatile substances from traversing segments of the filament before those segments pass into or through heater 114 and nozzle 112. In some cases, filament conditioner 200 primarily acts as a drier to remove moisture from filament, but filament conditioner 200 may also remove other volatile substances that may be less common but that could alter a printing process.

Filament conditioner 200 may be mounted on movable platform 130 as shown in FIG. 1 or may be separated from movable platform 130. Filament conditioner 200 may also be positioned upstream from extruder 116 along the filament guide system as shown in the example of FIG. 1, so that extruder 116 pulls filament from spool 160 and through filament conditioner 200 before feeding conditioned filament into heater 116 and nozzle 112. In an alternate configuration, conditioner 200 may be between extruder 116 and heater 114 so that extruder 116 feeds filament through filament conditioner 200 into heater 114 and through nozzle 112.

Figure 2:
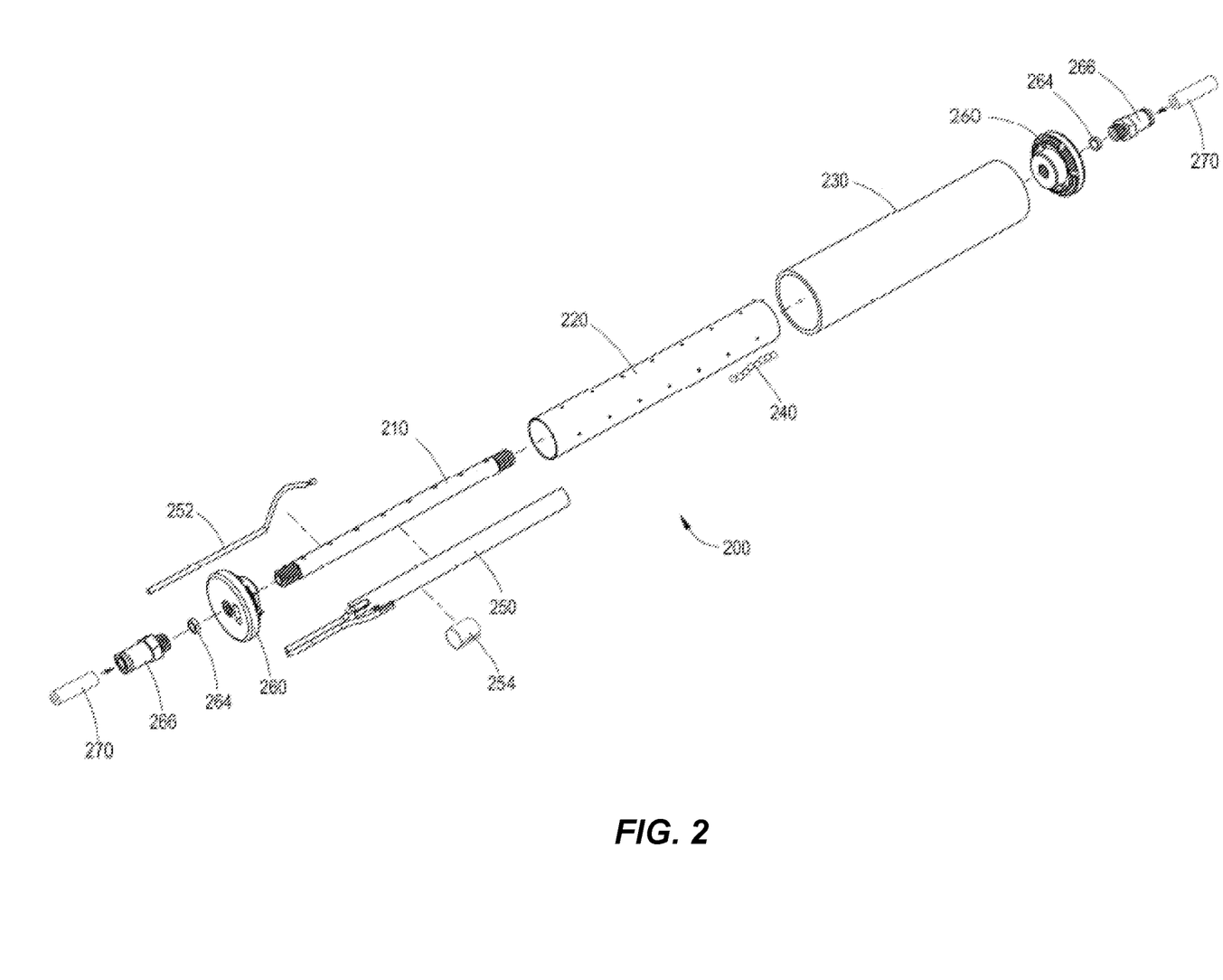
FIG. 2 shows an exploded view of an in-line filament conditioner or drier in accordance with an example of the present disclosure.
Figure 3:
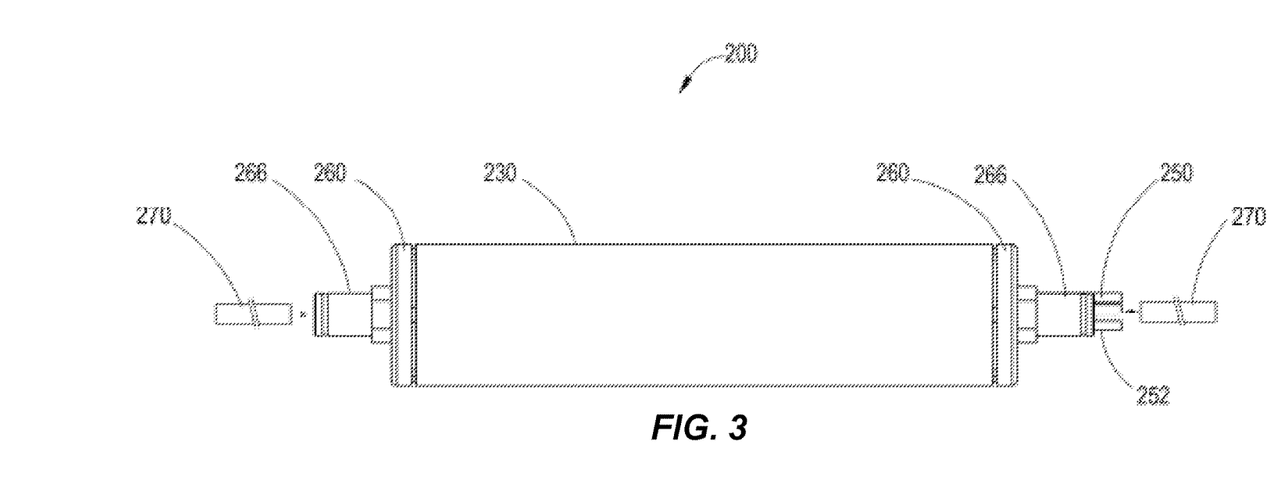
FIG. 3 shows an assembled filament conditioner/drier in accordance with the example of FIG. 2.
Figure 4:
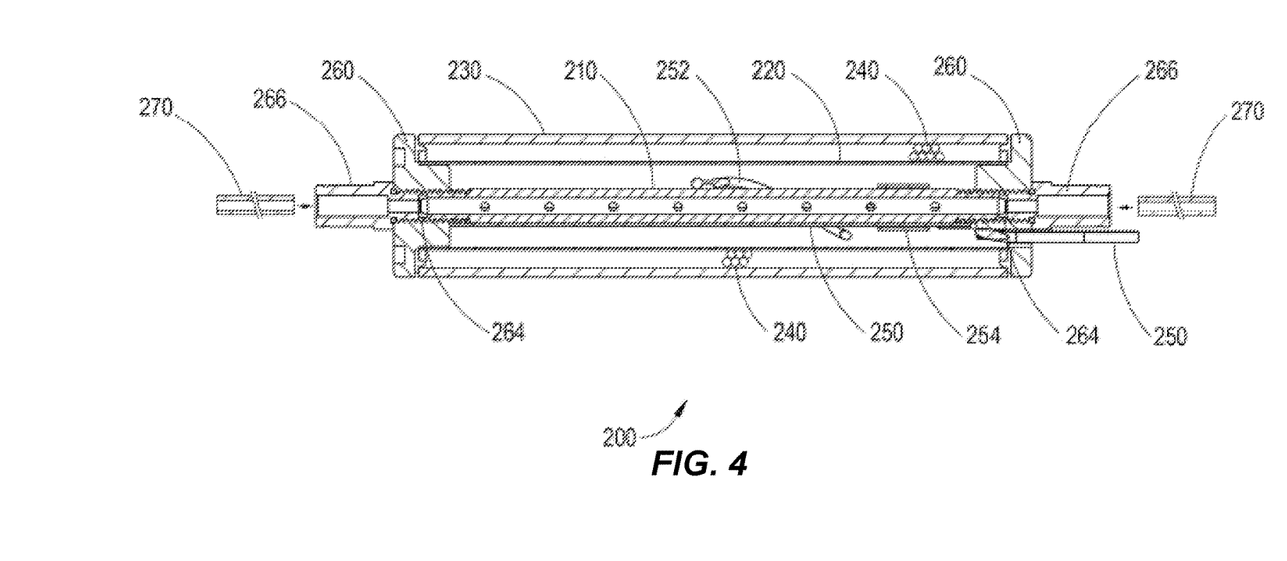
FIG. 4 shows a cross-sectional view of the filament conditioner/drier in accordance with the example of FIG. 2.

FIGS. 2, 3, and 4 respectively show an exploded view, an assembled view, and a cross-sectional view of a filament conditioner 200 in accordance with an example of the present disclosure. In the example shown, filament conditioner 200 includes a filament tube 210 nested inside a tube-shaped desiccant barrier 220, which is nested inside a tube-shaped cover 230. A desiccant material 240 resides in the space between cover 230 and desiccant barrier 220. Active portions of a heating element 250 and a thermocouple or other temperature sensor 252 may reside between filament tube 210 and desiccant barrier 220, and an adhesive or tape 254, e.g., high temperature Kapton tape, may be employed to attached heating element 250 or thermocouple 252 on filament tube 210.

End caps 260 may screw onto threaded ends of filament tube 210 and may be shaped to hold filament tube 210, desiccant barrier 220, and cover 230 at desired separations, e.g., in a coaxial configuration. End caps 260 include vent holes through which air may flow to remove moisture or other volatiles from the interior of filament conditioner 200 and particularly to remove moisture from desiccant 240 and prevent desiccant 240 from becoming saturated. End caps 260 may further accommodate electrical leads or terminals of heating element 250 and thermocouple 252. Compression fittings 266, e.g., Bowden connectors, may be threaded into an opposite end of a threaded opening that engages filament tube 210 and a heat shield 264 may be in the threaded opening to reduce heat transfer from filament tube 210 to adapters 266. Each compression fitting 266 also couples to ends of Bowden tube 270 of a printer, so that filament conditioner 200 may be in-line as part of a filament path of a printer. For example, a Bowden tube that forms part of a filament path in a 3D printer may be manufactured or cut to produce ends of Bowden tube 270 shown in FIGS. 2, 3, and 4, and a filament from one Bowden tube 270 end may enter one end of filament conditioner 200, pass through filament guide extending through filament tube 210, and exit from filament conditioner 200 into the other Bowden tube 270 that connected to a print head of the printer.

Figure 5:
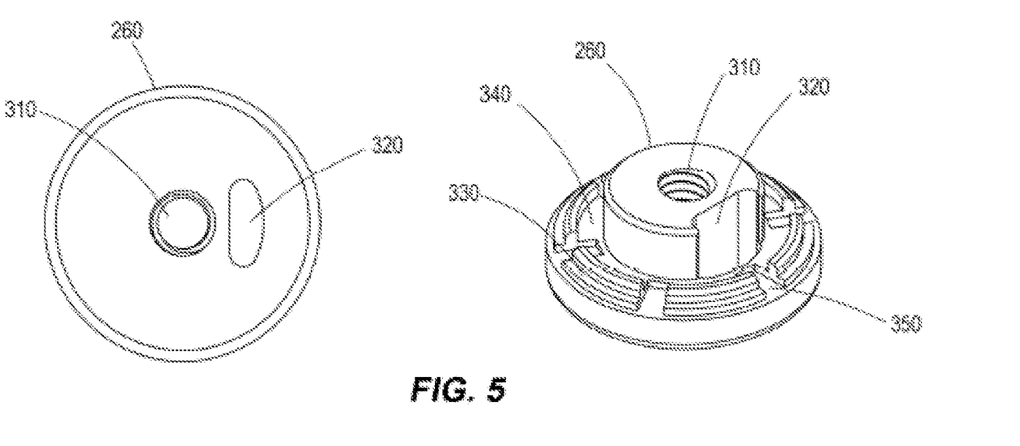
FIG. 5 shows example end caps for a filament conditioner/drier in accordance with an example of the present disclosure.

FIG. 5 shows an end view and a perspective view of end caps 260 in accordance with an example of the present disclosure. End caps 260 may be made of a thermally insulating material such as polyetheretherketone (PEEK) and in one example are about 1 inch in diameter. Each end cap 260 includes a central threaded opening or hole 310, e.g., a 6 mm threaded hole, and an offset wire passthrough 320 that extend through the end cap 260. An outer face of each end cap 260 may be relatively flat, while an inner face of each end cap 260 may be contoured to include an outer covering landing 330 shaped to hold an end of cover 230 in place and a desiccant barrier landing 340 shaped to hold an end of desiccant barrier 220 in place when end caps 260 are threaded onto opposite ends of filament tube 210. The inner face of each end 260 may be further contoured to provide vent slots 350, e.g., six radially arranged vent slots at both ends of a filament conditioner 200. The vent slots 350 may permit venting from the desiccant 240 held between desiccant barrier 220 and cover 230 in the assembled filament conditioner 200.

Figure 6:
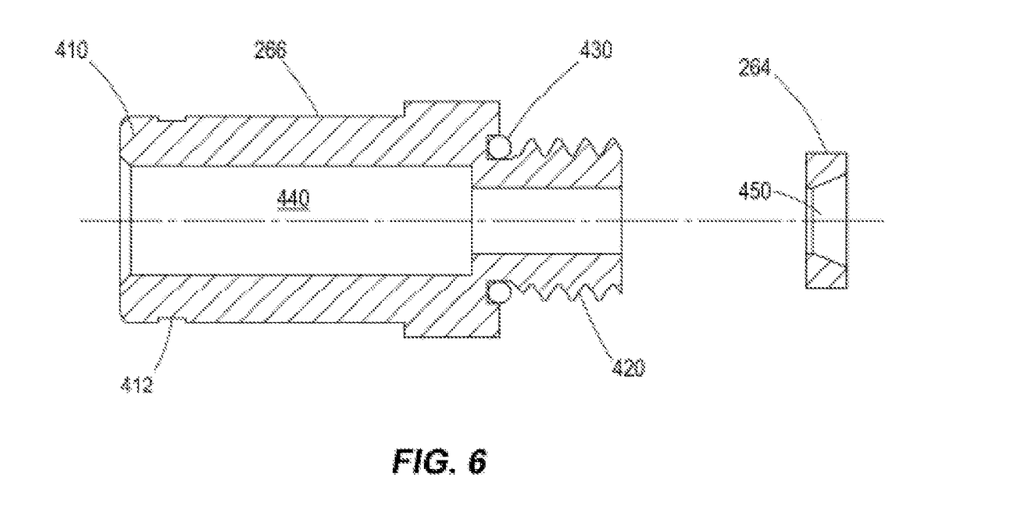
FIG. 6 shows a Bowden connector that may be used to connect an end cap of a filament conditioner/drier in line as part of the filament path of a printer.

FIG. 6 shows an example of a compression fitting or adapter, e.g., Bowden connector 266, that may be attached to the central threaded hole 310 of an end cap 260. Bowden connector 266 includes an attachment portion 410 such as a Bowden tube receptacle, which captures by compression a Bowden tube, e.g., Bowden tube 270 of FIG. 2. Bowden tube 270 is used to guide the filament from a spool or other source to the print head of a 3D printer. In the illustrated example, portion 410 has a snap ring groove 412, so that a snap ring (not shown) may better secure a Bowden tube 270 in the path of the filament in the 3D printer. Bowden connector 266 also has a treaded portion 420 such as a 6 mm threaded male end that fits the central threaded hole 310 of an end cap 260. An O-ring 430 may fit on threaded portion 420 and seal against the outer face of the end cap 260 when adapter 266 is screwed into the central threaded hole 310 of the end cap 260. A filament passthrough 460, e.g., a cylindrical bore, through Bowden connector 266 may thus guide filament into a filament conditioner, and the filament may pass from filament conditioner 200 to a print head without be exposed to an environment containing moisture or other volatile substances.

FIG. 6 also shows a reducer/heatshield 264 that fits in central threaded hole 310 of each end cap 260. Reducer/heatshield 264 may be made of a thermally insulating material such as PEEK and is placed between threaded end 420 of adapter 266 and the threaded end of a filament tube 210 to reduce heat transfer from a heated filament tube 210 to adapter 266 and from there to the filament guide system of a 3D printer. Reducer/heatshield 264 has a central hole 450 with a reduction taper to allow filament to transition from the smaller diameter from passthrough 460 into the filament tube 210 without binding or scratching filament.

Figure 7:
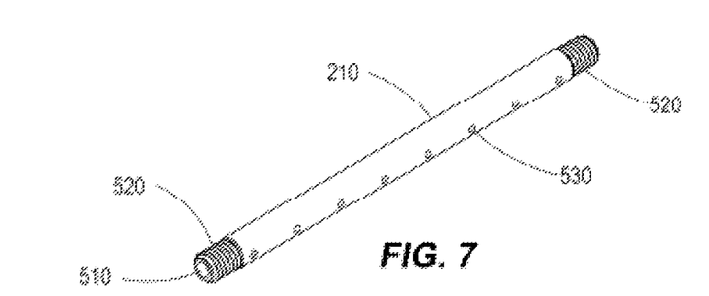
FIG. 7 shows a filament guide of a filament conditioner/drier in accordance with an example of the present disclosure.

FIG. 7 shows an example of a filament tube 210. Filament tube 210 may be a metal tube or pipe, e.g., a 6 mm aluminum tube, having a bore 510, threaded ends 520, and vent holes 530 through the side wall of filament tube 210. Bore 510 extends the length of filament tube 210 and serves as a filament guide or passthrough to guide filament through filament conditioner 200. Threaded ends 520 match the threading of central holes 310 of the end caps 260 so that end caps 260 may be threaded onto the ends 520 of filament tube 210. Vent holes 530 extend through the sidewall of filament tube 210 to permit passage of water vapor or other volatile substance out of a filament passthrough 510. Vent holes 530 may be spread along the length of filament tube 210 and may be of sufficient size, e.g., about 1.5 mm, and number, e.g., 6 or more, for passage of the expected flow of volatiles from filament passthrough 510.

Figure 8:
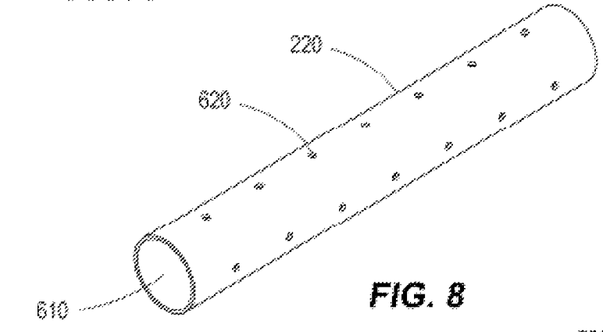
FIG. 8 shows a desiccant barrier of a filament conditioner/drier in accordance with an example of the present disclosure.
Figure 9:
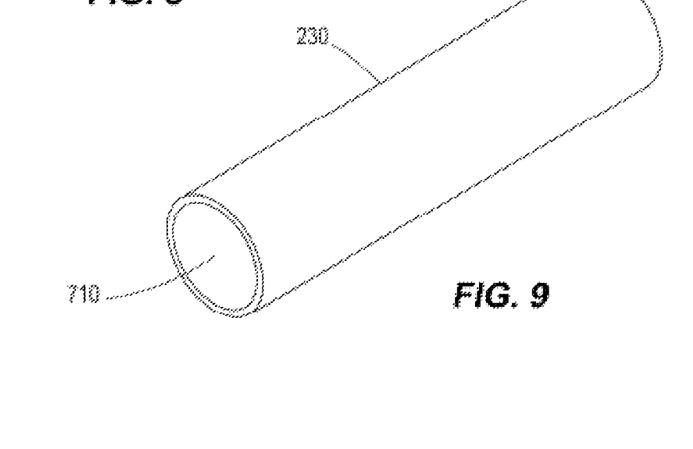
FIG. 9 shows an outer cover for a filament conditioner/drier in accordance with an example of the present disclosure.

FIGS. 8 and 9 show examples of a desiccant barrier 220 and an outer cover 230 for a filament conditioner 200. Desiccant barrier 220 may be a non-reactive tube having a passthrough 610 with a diameter large enough to accommodate filament tube 210 and active portions heating system components such as heating element 250 and thermocouple 252. Desiccant barrier 220 may be made of a material such as aluminum or other material that does not react with the desiccant 240 to be employed in the filament conditioner 200. Vent holes 620 extend through the sidewall of desiccant barrier 220 and may be smaller than the size of particles the desiccant. For example, vent holes about 1 mm in diameter, which smaller than a common particle size for a desiccant such as silica gel. Vent holes 620 may be spread along the length of desiccant barrier 220 and may be of sufficient number, e.g., about 25 or more, for passage of the expected flow of volatiles from passthrough 610. Cover 230 may be a non-reactive tube, e.g., a clear polycarbonate tube, having a passthrough 710 large enough to accommodate desiccant barrier 220 and desiccant between desiccant barrier 220 and outer cover 230. With a cover 230 that is transparent, desiccant 240 may be a visible feature of the filament conditioner. The changing color of desiccant 240 may help determine the condition of desiccant 240 for maintenance, e.g., blue desiccant being dry and ready for use, or pink desiccant being saturated indicating that maintenance may be needed.

A filament conditioner 200 may be assembled by threading one end of filament tube 210 into an end cap 260 in which spacer 264 and Bowden connector 266 have been installed, fitting a heating element 250 and a thermocouple 252 adjacent to the filament tube 210 with leads of the heating element 250 and thermocouple 252 extending out through the wire passthrough 320 of the end cap 260, nesting filament tube 210 in desiccant barrier 220 with an end of desiccant barrier 220 abutting landing 340 on the end cap 260, nesting desiccant barrier 220 in cover 230 with an end of cover 230 abutting landing 330 on the end cap 260, filling the space between desiccant barrier 220 and cover 230 with desiccant 240, and threading a second end cap 260 on the opposite end of filament tube 210 to hold the components of filament conditioner 200 in place. The assembled filament conditioner 200 may then be installed along the filament guide system of a 3D printer, so that filament may be fed through the filament conditioner 200 before being heated in a print head.

Figure 10:
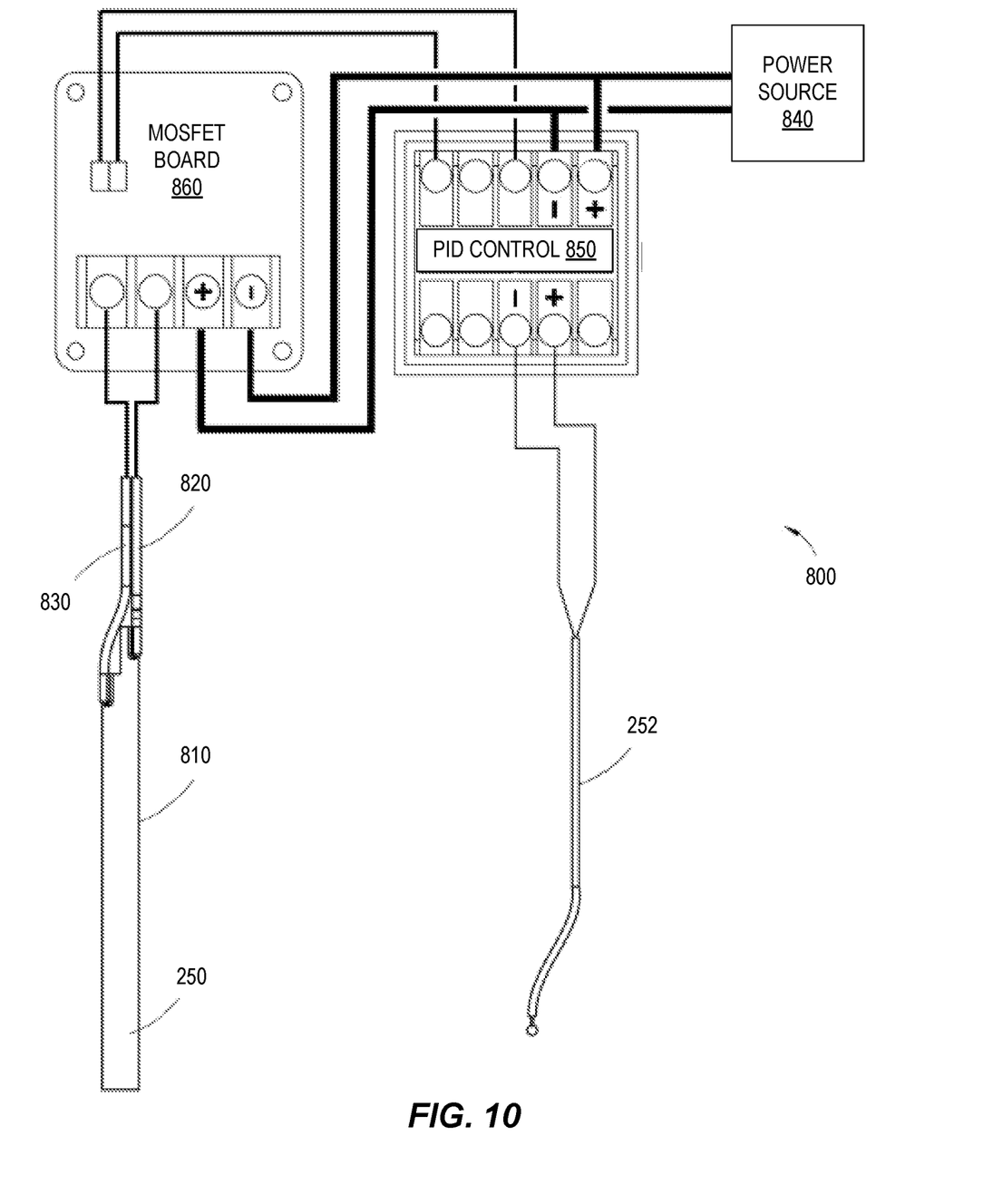
FIG. 10 illustrates a heating system for a filament conditioner/drier in accordance with an example of the present disclosure.

A filament conditioner 200 may employ a controller for the heating element 250. FIG. 10 shows a heating system or pre-heater 800 for a filament conditioner 200 in accordance with an example of the present disclosure. In the illustrated example, the controller includes heating element 250, thermocouple 252, a MOSFET power regulator 860, a proportional-integral-derivative (PID) control module 850, and a power source 840. In the illustrated example, heating element 250 in heating system 800 includes a resistive plate 810 with wire leads 820 and 830. Resistive plate 810 may, for example, be a polyamide resistive plate that is shaped to fit over filament tube 210 and secured by Kapton tape 254. Wires 820 and 830 fit through wire passthrough 320 in an end cap 260, allowing heater assembly 250 to be connected to MOSFET power regulator 860 that operates heater assembly 250 to heat filament to a desired temperature, e.g., about 30° C. to 150° C., when the print head further heats conditioned filament to about 200° C. to 320° C. In the illustrated example, PID control module 850 connects to thermocouple 252, which has an active portion inside desiccant barrier 230. PID control module 850 provides a control loop mechanism employing feedback from thermocouple 252 to continuously control of MOSFET power regulator 860 and modulate the current powering heating element 250. For example, PID control module 850 may turn cause MOSFET board 860 connect power source 840 to power heating element 250 when thermocouple 252 indicates a temperature below a target, and to turn off heating element 250 when thermocouple 252 indicates the temperature has reached the target. For example, heating element 250 may be operated as needed to maintain the interior of desiccant barrier 230 at a target temperature, e.g., about 30° C. to 150° C.

The target temperature of a filament conditioner 200 may be set by a control setting of PID control module 850. PID control module 850 may be set to select the target temperature of conditioned filament according to the type of filament, e.g., according to the filament material. In general, the target temperature for conditioned filament in will be less than the glass transition temperature of the filament to avoid deformation of the filament being fed to the print head, and the print head generally heats the filament to a temperature at or above the glass transition temperature to fuse layers of filament material forming an objection being printed. Table 1 indicates target in-line filament drier (IFD) temperature settings and glass transition (TG) temperatures for some common filament materials including acrylonitrile butadiene styrene (ABS), acrylonitrile styrene acrylate (ASA), nylon, Polyethylene terephthalate glycol (PETG), polylactic acid or polyactide (PLA), polycarbonate (PC), thermoplastic polyurethane (TPU/TPE), PC-ASA, PVA, and CF-Nylon.

TABLE 1

Inline Filament Drier and Glass Transition Temperatures of Materials

| MATERIAL | IFD TEMP (° C.) | TG TEMP (° C.) |
| --- | --- | --- |
| ABS | 75-90 | 105 |
| ASA | 75-90 | 105 |
| Nylon | 80-95 | 100 |
| PETG | 60-75 | 80 |
| PLA | 40-50 | 70 |
| Polycarbonate | 130-140 | 145 |
| TPU/TPE | 40-50 | N/A |
| PC-ASA | 100-120 | 130 |
| PVA | 50-60 | 80 |
| CF-Nylon | 90-100 | 100 |

Although particular implementations have been disclosed, these implementations are only examples and should not be taken as limitations. Various adaptations and combinations of features of the implementations disclosed are within the scope of the following claims.

What is claimed is:

1. A system comprising:
a filament tube having a sidewall defining a filament passthrough and having a plurality of first vent holes extending through the sidewall;
a heating element positioned to heat a filament inside the filament tube;
a desiccant barrier containing the filament tube and the heating element, the desiccant barrier including a plurality of second vent holes through a sidewall of the desiccant barrier;
a cover containing the desiccant barrier; and
a desiccant in a space between the cover and the desiccant barrier, wherein
the filament tube, the desiccant barrier, and the cover comprise nested tubes.

2. The system of claim 1, further comprising:
a first end cap abutting first ends of the filament tube, the desiccant barrier, and the cover; and
a second end cap abutting second ends of the filament tube, the desiccant barrier, and the cover.

3. The system of claim 2, wherein at least one of the end caps is shaped to form vents extending from the space between the cover and the desiccant barrier to an exterior of the system.

4. The system of claim 1, further comprising a controller configured to regulate the heating element to maintain filament in the filament passthrough at a target temperature.

5. The system of claim 4, wherein the controller comprises:
a power regulator circuit board, PID control module, power distribution circuit board with integrated fuse.

6. The system of claim 4, further comprising a temperature sensing element, the controller regulating the heating element based on a reading from the temperature sensing element.

7. The system of claim 6, wherein the sensing element comprises a thermocouple extending between the filament tube and the desiccant barrier.

8. The system of claim 4, wherein the target temperature is between 30° C. and 150° C.

9. The system of claim 1, wherein the system is a filament conditioner or drier.

10. A system comprising:
a filament tube having a sidewall defining a filament passthrough and having a plurality of first vent holes extending through the sidewall;
a heating element positioned to heat a filament inside the filament tube;
a desiccant barrier containing the filament tube and the heating element, the desiccant barrier including a plurality of second vent holes through a sidewall of the desiccant barrier;
a cover containing the desiccant barrier; and
a desiccant in a space between the cover and the desiccant barrier, wherein
the system is a Fused Deposition Modeling (FDM) 3D printer.

* * * * *